Oct. 25, 1938.  G. LANGFORD  2,134,450
METHOD OF REFORMING RAIL JOINT BARS
Original Filed Sept. 2, 1936    3 Sheets-Sheet 1
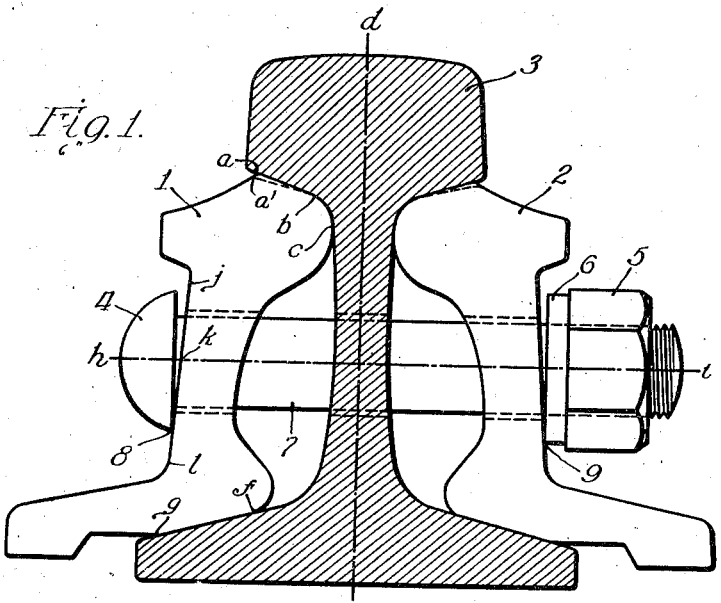
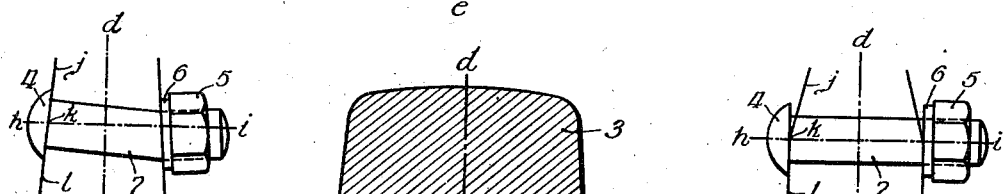
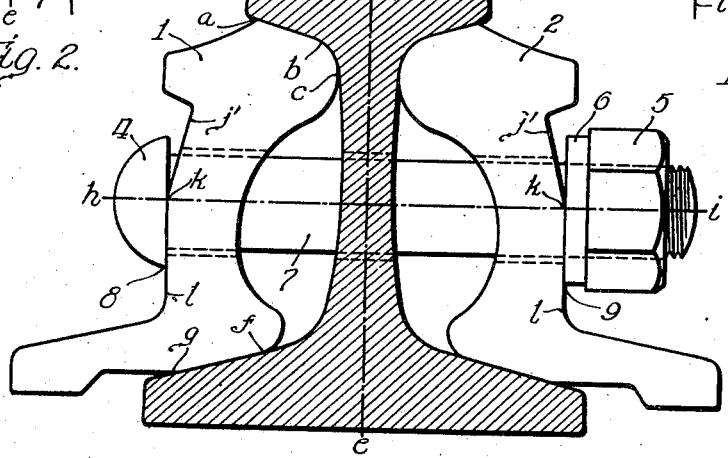
Inventor:
George Langford Oct. 25, 1938.  G. LANGFORD  2,134,450
METHOD OF REFORMING RAIL JOINT BARS
Original Filed Sept. 2, 1936   3 Sheets-Sheet 2
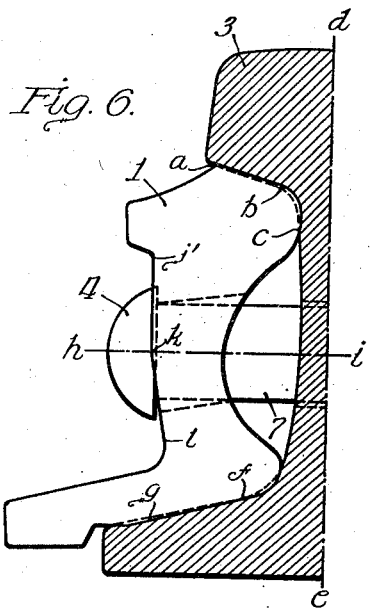
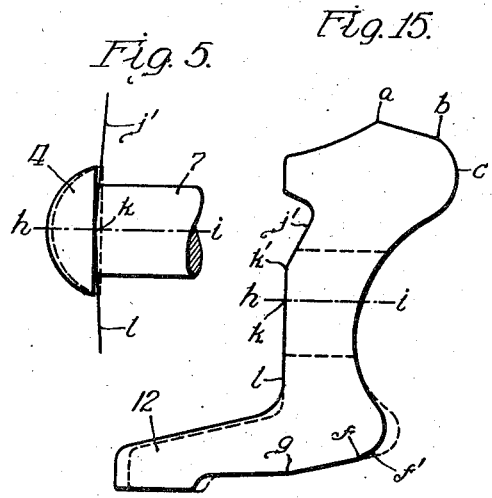
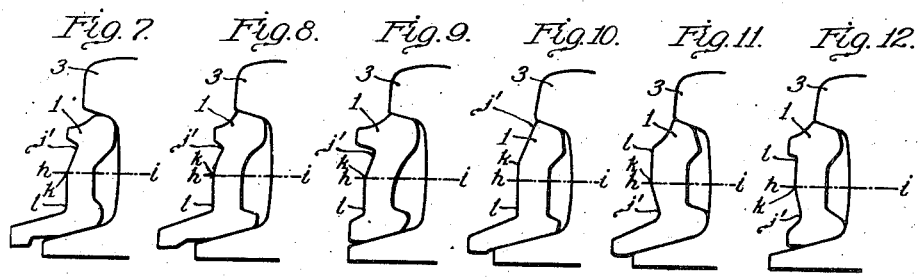
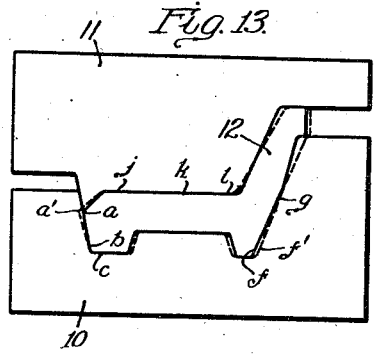
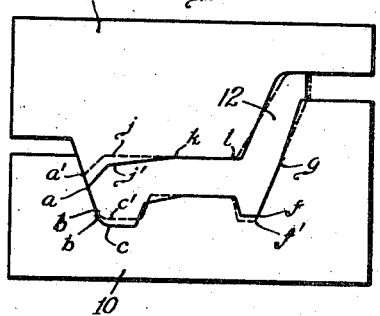
Inventor:
George Langford Oct. 25, 1938.                G. LANGFORD                2,134,450
              METHOD OF REFORMING RAIL JOINT BARS
            Original Filed Sept. 2, 1936    3 Sheets-Sheet 3
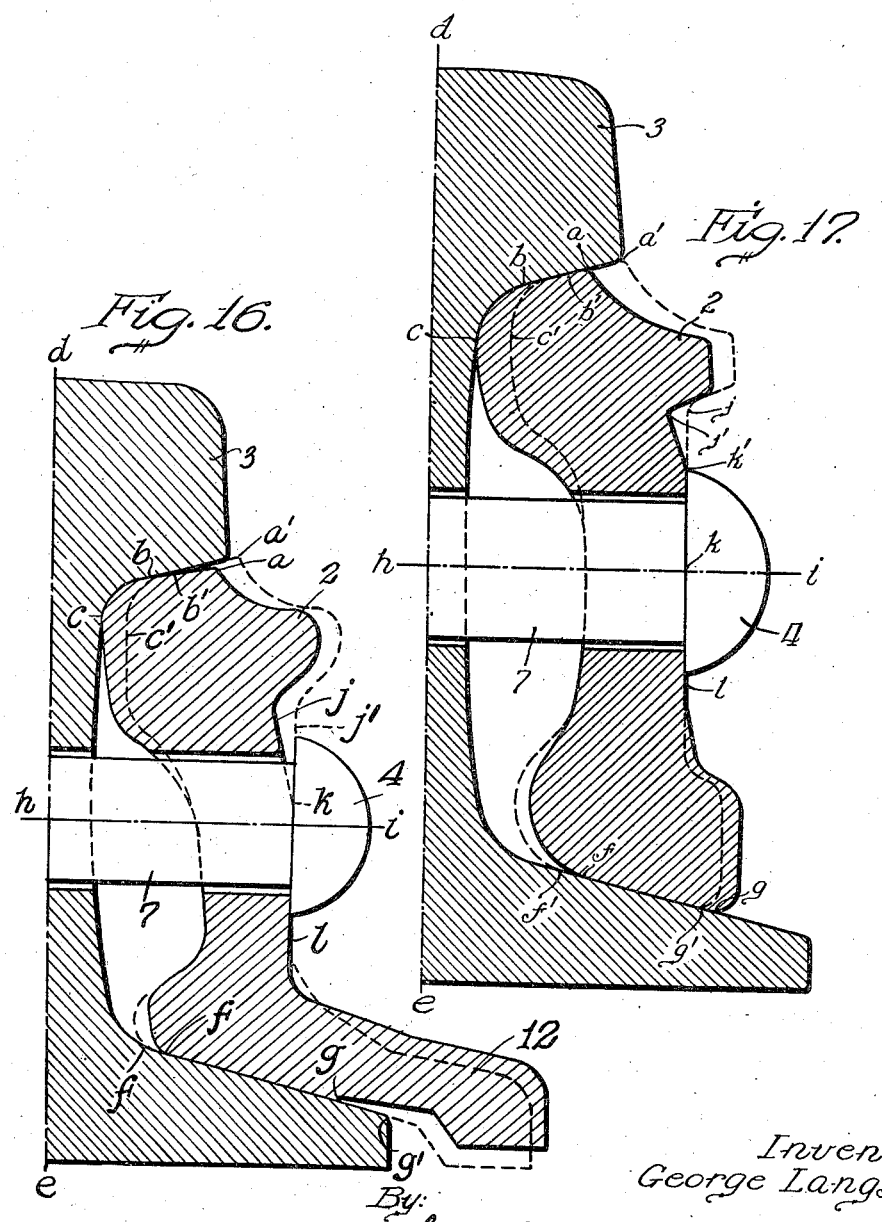
Inventor:
George Langford
By:
Brown, Jackson, Boettcher & Dienner
Attys.

Patented Oct. 25, 1938

2,134,450

UNITED STATES PATENT OFFICE 2,134,450

METHOD OF REFORMING RAIL JOINT BARS

George Langford, Joliet, Ill.

Original application September 2, 1936, Serial No. 99,074. Divided and this application February 1, 1937, Serial No. 123,400

3 Claims. (Cl. 29—169)

My invention relates to rail joint bars, and has to do with a method of reforming bars for producing a certain type of bar used in and typifying a certain kind of joint wherein the wear resulting from service is compensated for in a special manner.

It will be helpful to a clear understanding of the method of my invention to consider first certain bars of the prior art and some forms of bars produced by my method.

In ordinary bars, joint wear is taken up by drawing the top and bottom of the bar to the rail more or less equally, this being accomplished by tightening up the joint bolts. The head end and nut end of each of the four or six bolts used, are seated on the outer faces of each pair of bars, so that when the nuts are screwed up, the bars are forced in tightly to top and bottom fishing engagement with the rails. The bolts exert a very powerful pull when forcing the bars into their initial tight fitting position. Ordinarily the outer bolting face of each bar is perpendicular to the longitudinal axis of each bolt; and no more than a direct pull of the bolts is required to place and maintain the bars in tight contact with the rails. This is true of bars whose outer bolting faces are perpendicular to the horizontal axis of the bolts. However, in a certain type of bar, the bolting face is inclined to the longitudinal bolt axis, so that the pull is indirect, throwing great transverse strains upon the bolts. Said type comprises any cross-sectional form of bar whose outer face of the middle or web portion is ordinarily angularly inclined to the vertical axis of the rail, there being a bolt hole through said web portion, and the area of said outer face, adjacent said bolt hole, serving as a bolting face to engage the head end of the bolt, or nut, when the joint is tightened up. The bar of my invention includes a novel feature whereby a direct bolt pull may be exerted upon the face of a bar ordinarily inclined to the vertical axis of the rail and to the longitudinal axis of the bolts. The outer face of the bar is inclined at the beginning of and during a large part of its life. This pertains to a type of bar whose wear take-up is all at the bottom, of which the commercially known head free and full head contact bars are representative. Such bars are hinged at the top and swing in at the bottom as the joint wears, thereby changing the angularity of the outer bolting face of the bar.

The common practice is to divide the angularity of the inward swing equally each side of the perpendicular, so that in a new joint, the outer bolting face of each bar is inclined about 3° in each bar, making a total of about 6° in the pair of bars in a joint. This inclination of the bolting faces throws great strain upon the bolts. The main object of my invention is to provide for a direct instead of an indirect bolt pull. Another object is to remove unnecessary strains upon the bolts. Still another object is to provide a form of bar which may be advantageously reformed from a new or from a worn bar. These and other advantages will be understood from the following description and from the accompanying drawings, in which:

Figure 1 is an end view of a newly made rail joint illustrating the prior art as pertaining to the type of rail joint to which my invention is particularly applicable;

Figure 2 is a fragmentary end view of the bolt action of Figure 1;

Figure 3, comparable with Figure 1, typifies a rail joint embodying bars produced by the method of my invention;

Figure 4, comparable with Figure 2, shows the bolt action of Figure 3;

Figure 5, a fragmentary end view shows the action of the head end of the joint bolt when the bar has completed the first half of its life in the joint;

Figure 6, comparable with Figure 3, shows the rail joint embodying bars produced by the method of my invention at the end of its life;

Figures 7–12 inclusive, illustrate various forms of bars produced by the method of my invention;

Figure 13 is a reforming method of the prior art;

Figure 14 illustrates the reforming method of my invention;

Figure 15 illustrates a variation of the method of my invention;

Figure 16 is a half sectional end view of a rail joint, taken on the center line of one of the bolt holes, illustrating a second variation of the method of my invention; and Figure 17 is a half sectional end view of a rail joint similar to but functionally different from that of Figure 16, illustrating a third variation of the method of my invention.

This application is a division of my copending application for Rail joint, Serial No. 99,074, filed September 2, 1936.

Figure 1 is an end view of a rail joint showing two joint bars 1 and 2 newly bolted to a rail 3. The two bars are of full head contact type disclosed in my Patent No. 1,759,458, issued May 20, 1930. This bar has rail head contact a—b plus rail fillet contact b—c. Another bar of somewhat the same general type is the head free bar which is similar to the bars of Figure 1 except at the top, shown by the dotted line a'—b, there being clearance between the outer part of the bar's top surface and the under side of the rail head. Figure 1 may then be considered as representing a head free, as well as a full head contact type of bar. The two have the same features in common, of rail head-web fillet contact and inward rotative movement at bottom to take up wear.

In bars of this type, the outer web face varies in its angularity to the vertical, as wear and take-up progress. In the ordinary head contact bar, this outer face once vertical remains vertical for the reason that wear is taken up at the top as well as at the bottom. But in the bar of Figure 1, the take-up is only at the bottom, and the bar swings in like a door, hinged on the top inner fillet b—c.

I find that in general, the bar swings about 6° from the beginning to the end of its life in the joint. The common practice has been so to design the bar, that when new its outer face will incline about 3° to the vertical. This inclination is outwardly at the bottom. When the bar's life is ended, it will be inclined 3°, but inwardly at the bottom. In this way, the swing of 6° is equalized from beginning to end without any excess of inclination in either extreme. The bar of my invention is an improvement in this method of designing the outer face of a bar.

In Figure 1, d—e is the vertical axis of the rail, h—i is the horizontal axis or longitudinal axis of the joint bolts. The angles of the top a—b and bottom f—g fishing surfaces are the angles of the top and bottom fishing surfaces in relation to line h—i. j—k—l is the outer face of the bar. In ordinary head contact bars, j—k—l is generally vertical or parallel to axis d—e, and the top and bottom fishing angles are the same in their relation to this outer face of the bar. In Figure 1, face j—k—l is inclined about 3°, making the top fishing angle 3° less, and the bottom fishing angle 3° more in relation to it. In the case of A. R. A.—A. rail sections ordinarily used, it is common practice to incline the face j—k—l of the bar newly applied at about 3°, the top fishing angle in relation to it then becoming 11° and the bottom fishing angle 17°, although the top and bottom angles are similarly inclined 14° to the horizontal axis h—i. In effect, the bar is tilted about 3°, bottom outward, and this tilting is shown in the outer face j—k—l of the bar of Figure 1.

j—k—l is the bolting face which engages the head 4 of bolt 7 for one bar, and washer 6 on the other bar. The joint is made tight by screwing up the nut 5. Figure 1 shows the two bars bolted to the rail but not finally tightened.

Inasmuch as the bolt is straight, and the bolting-faces j—k—l of the bar are each inclined 3°, the bolt head 4 will have initial contact only at its edge 8, and washer 6 will have contact only at 9. With complete and final tightening, the bolt must yield or bend somewhere so that the bolt head 4 and washer 6 will acquire more complete contact. This is illustrated in the end view diagram of Figure 2. The bolt is shown bent in the threads of the nut end. It may bend at the head end or it may bend in the middle. In any case it must bend somewhere under the powerful pull of the nut seating itself and the head on the inclined bolting face of each bar. This is an immediate effect. The bolts must be forcibly bent to seat the head and washer properly on the bolting face of each bar. Furthermore this bending of the bolt must continue. When the joint is new, the ends of the bolt must be bent up, and when the joint is old, they must be bent down. This is very severe punishment on the bolts. They have broken or been pulled in two, requiring stronger design and increased physical properties acquired by oil-quenching.

It can be seen and understood from Figures 1 and 2 that the bolts must withstand much abuse, and this is what I propose to remedy.

Figure 3 is an end view of a rail joint embodying bars produced by the method of my invention. Only the upper part j'—k of the outer face j'—k—l of the bar is inclined, and this does not become in part, as in Figure 1, an initial bolting face. The initial bolting face is k—l, this being made substantially vertical so that the lower half of the head 4 and the washer 6 may be in tight contact with the outer face of the bar without any bending of the bolt. The effect upon the bolt is shown in Figure 4, which latter may be compared with Figure 2. The bars seat at least half of the bolt head and washer, and that is enough to secure a tight joint without any bending of the bolts. It is obvious that bars of the type having top anchorage and bottom inward movement possess desirable qualities; and so a tilted bolting face resulting in strained and bent bolts has been accepted as a necessary adjunct. But this bolt straining and bending is unnecessary, and I find it highly desirable to remedy it in the manner illustrated and described.

It is important to distinguish between the initial condition and conditions which result later on from wear. For example, in Figure 1 it is obvious that some part of the bolt must be bent before the new joint can be made tight. There is no time for the bars or bolts to wear themselves into proper adjustment. It is also obvious in Figure 3 that the bolts need not be bent to make the joint tight when new. It may also be shown that after the first fitting, further changes are only gradual, and that as the bar rotates inward at the bottom, the bolt head and washer adjust themselves gradually by wear and have time to do so, seeing that the change of angularity of the outer bolting face of the bar is very gradual.

Figure 5 is a fragmentary view of the head end of the bolt. It is assumed that the bar is at about the middle of its life, having swung in about three degrees at the bottom. In this time elapsed, the bolt head wears into the bar from its new position, full lines, to its worn position, dotted lines. The contact of the bolt head and outer face of the bar is made sufficient by gradual wear.

Figure 6 shows half of the joint at the end of its life. Surface j'—k has become the secondary bolting face. It has become so by the inward swing at bottom, but in the meantime direct bolt pull has been maintained by gradual wear. The bolt head wears into the bar and adjusts its seating thereby. It is a very common occurrence in worn bars to see wear by the head and nut end of the bolt, $\tfrac{1}{16}$ inch and more deep in the bars. This is a gradual wear adjustment quite different from the initial bolt bending adjustment necessary in Figure 1. It is this initial adjustment, that the bar of my invention is largely concerned with. The gradual adjustment to change in the bar's inclination, is a gradual wear adjustment which takes care of itself.

The bar is provided with a primary and a secondary outer bolting face adjacent to and inclined obtusely to each other, said bolting faces being adjacent, and above and below the bolt hole. The primary bolt face is perpendicular or nearly so, to the longitudinal axis of the bolt so as to secure enough seating of the head and nut end of the bolt to avoid bending the bolt. The secondary bolting face comes into use when the bar has swung in at the bottom. In Figure 3, $k$ may be a little above the bolt center line $h$—$i$. It may also be a little lower.

Figures 7 to 12, inclusive, represent various forms of bars produced by the method of my invention. In Figures 7 to 10 the primary bolting face is on the lower part; in Figures 11 and 12 it is on the upper part of the bar. Figure 7 is a head free angle bar. Figure 8 is an ordinary head contact bar of angle type, Figure 9 being one of I-beam type. In Figure 10, the primary bolting face extends a little above the horizontal axis $h$—$i$.

Figures 11 and 12 represent flange free bars. The wear take up is at the top, and the bar swings in at the bottom on the rail flange-web fillet. Figure 11 is an angle form, and Figure 12 an I-beam form. The primary bolting face is on the upper part of the bar.

In Figure 3, it may be seen that the general aspect of the bar is much like that of an ordinary bar with the upper half bent inward, and that is broadly the method I use for making it from an ordinary new or worn bar. The method of making the bar follows its form closely, although it presents novel aspects when compared with the method of the prior art.

The prior art is shown in Fig. 13. It is described and figured in my Patent No. 1,833,026 issued November 24, 1931. A top die 11 is closed upon a bottom die 10 defining a die cavity in full lines. The bar to be reshaped in the cavity is in dotted lines. To facilitate explanation, the original bar and the bar to be reformed in the die cavity, will be considered as suitable for Standard A. R. A.—A. rail, whose top and bottom fishing angles are each inclined 14° (slightly more) to the horizontal, the latter corresponding to $h$—$i$, the longitudinal axis of the bolts. The outer face of the bar, $j$—$k$—$l$, which is the bolting face is shown in Figure 13 as horizontal or parallel to the vertical axis $d$—$e$ of the rail in Figure 6. The angles of the top surface $a'$—$b$ and bottom surface $f'$—$g$ of the original bar are each inclined 14° to the horizontal axis of the rail or center line of the bolts $d$—$e$.

To reform the original head contact bar, in dotted lines, to a full head contact bar, in full lines, surface $a$—$b$ of the bottom die 10 is inclined not 14° but 11°, and surface $f$—$g$ is inclined 17°. As the sum of the top and bottom angles is 28°, the same as the rail, the resultant bar will fit the rail as in Figure 1, the bar being tilted, bottom outward with its outer bolting face inclined 3° to the vertical axis $d$—$e$ of the rail. This thrusts the head of the bar in to rail head-web fillet contact $b$—$c$, and the foot of the bar is thrust outward so as to increase its wear take-up space from the foot of the rail web. These effects are gained in large part at least by merely decreasing the top fishing angle and increasing the bottom fishing angle in like amount, so that when the reformed bar is applied to the rail, it will be tilted to the vertical axis of the rail by as many degrees of angularity as the top surface of the bar was decreased and the bottom surface increased. Assuming in Figure 1 that the top and bottom fishing angles of the rail are each 14°, the reformed bar of Figure 13, with its outer face $j$—$k$—$l$ vertical, its top surface $a$—$b$ inclined 11° to that face, and its bottom surface $f$—$g$ inclined 17°, will when bolted to the rail as in Figure 1, be equivalent to a bar whose top and bottom fishing angles are each inclined 14° to the horizontal, and its outer bolting face inclined 3° to the vertical. This tilting of the bar also tilts the outer portion 12 of the foot of the bar to provide rail clearance as shown in Figure 13. I find however that in most cases, it does not provide sufficient clearance, and that there must be provision for supplementary bending before or during the die operation. The prior art is further shown in Patent No. 1,829,247 issued October 27, 1931, to W. P. Thomson. This patent discloses a method of reforming a head contact bar into a head free bar, the outer face of the web portion, comprising the bolting face being made angularly inclined to the vertical axis of the rail by decreasing the angularity of the top fishing surface, and by increasing the angularity of the bottom fishing surface, the increase of bottom fishing surface angularity being essential to the method. As distinguishing from the Thomson method, that of my present invention leaves the bottom fishing surface angularity unchanged. Furthermore in cases where the top inner fillet of the original bar conforms to the top head web fillet of the rail or nearly so, said top inner fillet may remain unchanged in the reformed bar.

Figure 14 represents the method of the present invention. $j$—$k$—$l$ is the bolting face of the bar, corresponding to face $j$—$k$—$l$ of the bar in Figure 13. In Figure 14, instead of decreasing the top fishing angle, and increasing the bottom fishing angle a like amount, the top and bottom fishing angles are made the same. The upper half of the bar is bent inward, and the result is as shown in Figure 3, so that the bolting face $k$—$l$ of the bar is placed vertically and is not inclined as in Figure 1.

It is more difficult to change the angularity of a fishing surface than to move it slightly inward or outward without change of angularity, although in either case, the worn parts of a fishing surface must be restored vertically. The method of Figure 14 is one wherein the top or bottom part of a bar including a fishing surface is moved inward or outward; that of Figure 13 involves a redistribution of metal within said top or bottom part as distinguished from a mere shift in position of said top or bottom part. In Figure 14 the top of the bar is thrust downward in the die; inward to the rail. But the main distinction in Figure 14, as compared with Figure 13, is that the fishing angles at top and bottom remain unaltered in their relations to the outer bolting face of the bar, or more correctly, the primary bolting face with which this invention is in greater part concerned.

Among the large number of joint bars now in use, there are some cases requiring more complicated treatment than others. To gain sufficient bottom take-up space, the inner extension of the bottom part of the bar may be shortened, the original part being shown in dotted line, Figure 14, and the shortened part in full line. Only the inner extension may be pushed outward, or the entire bottom part of the bar may be pushed outward, so that the reformed bar is as in Figure 15 full lines, the original bar being shown in dotted lines. The top of the bar is thrust inward, and the bottom outward, the feature of an outer primary bolting face being maintained, the web being bent at $k'$ instead of at $k$.

Figure 16 is a variation of my invention directed to a particular form of head free bar, the substance of my copending patent application, Serial No. 87,401, filed June 26, 1936. This bar has its top head clearance and the width of its bottom fishing contact so arranged, that although beginning its life as a head free bar, the top contact width increases by joint wear until full head contact a—b—c is established as in Figure 3. In Figure 16, the top of the bar is thrust inward, and the bottom outward, a bar from which it may be made, being shown in dotted lines. The bottom part of the bar may be shortened on the inside or on the outside if desired. The primary bolting face k—l extends a little above the longitudinal axis h—i of the joint bolt. The secondary bolting face j'—k is inclined obtusely to the primary bolting face k—l. In its relation to the original bar, in dotted lines, it can be seen that the top of the bar is rotated inward on a center above axis h—i, and that the upper part of the web is rotated inward. The lower part of the web is in its original perpendicular position, and the bottom fishing surface f—g retains its original angularity. The degree of angularity of the secondary bolting face j'—k in relation to the primary bolting face k—l may vary in some cases. 6° is a fair average but it may be more or less, this being dependent upon the amount of swing desired at the bottom of the bar, from the beginning to the end of its life in the joint. Figure 16 shows only the head end of the bolt. The conditions at the nut end are practically the same. This figure shows clearly the bolt head seating upon the bar's primary face k—l, and the direct pull obtainable without any bending of the bolts as tightening of the nut draws the bar into position ready for use. In this bar the top inner face of the bar slopes away from the rail web on its lower part so that the bar will not engage the rail web as it wears and force the top of the bar outward. The wear movement of the bar is upward and its top surface increases in rail contact width as the joint wears.

By the method of Figure 15, head contact, head free, full head contact and flange free bars may be each reformed from new or worn bars of any of the types named, without change of angle of the original top or bottom fishing surface or both, provision being made for an outer primary and an outer secondary bolting face adjoining each other and the secondary face being obtusely inclined to the primary member, the latter being perpendicular, or nearly so, to the longitudinal bolt axis. The bar of Figure 16 has one advantage over that of Figure 1 in reference to manufacture—punching of the bolt holes. It is customary to punch perpendicularly to the outer face of the bar web. In Figure 1 this would incline the bolt holes downwardly and inwardly. In Figure 16 the holes are punched preferably perpendicular to the primary bolting face k—l, so that there will be no inclination of the holes.

It can be seen that the drawings illustrate only a few of the many variations of application, and so my invention should not be limited to any particular forms, and may include others not shown nor described. While intended primarily for such types of bars as have top hinge and bottom swing movement to take up wear, my invention may be applied to other types with inclined outer bolting faces where more direct bolt pull is desired.

Figure 17 is a bar very similar to but functionally different from that of Figure 16 and also Figure 15. In the two latter, the lower primary bolting face k—l extends to above the center line h—i but not more than permits j'—k' in Figure 15 to become an upper secondary bolting face after the head and nut ends of the bolt have worn into the bars and after the bottom of the bar has swung inward in the latter part of its life. However, as an initial direct bolt pull is my first concern, and as I know that wear at the head and nut end will maintain a more or less direct bolt pull as the bar swings gradually inward at the bottom on the top hinge b—c, the upper bolting face k—k' in Figure 17 is in the same plane as k—l, and the obtusely inclined upper face j'—k' does not become a secondary bolting face, although the head and top of the web member are thrust inward. In other words, the primary bolting face is k'—l, and there is no secondary bolting face except as is acquired by wear.

In Figure 17 the original head contact bar, as fitted to the rail, is indicated in dotted lines, and the bar produced by the method of my invention is shown in full lines. To produce the latter bar the upper portion of the web, above the bolt head, is bent inward and downward. The resulting bar is of full head contact type, contacting the underside of the rail head and the rail web-head fillet, and the bottom of this bar is disposed further away from the rail web than that of the original bar, as shown.

Described briefly, my invention is a method of reforming new or worn bars of head contact type, preferably into bars of full head contact or head free type; and if desired, into bars of head contact or flange free type. In all cases, the bar is heated to a working temperature and subjected to pressure in dies, rolls or other means so arranged as to accomplish my desired purpose.

When reforming bars of head contact or full head contact type the pressure is so applied as to force the top part of the bar and an upper portion of the web part of the bar inward, the central portion at least of the web part, and preferably its lower portion also, remaining relatively undisturbed, although the extreme lower portion may in some cases be moved outward. The lower part may be moved outward, or it may remain unchanged or its inner extended portion may be shortened, or its outer extended portion may be bent upward to provide rail flange clearance. These various treatments of the lower part of the bar are intended to permit freedom of rotation inward to take up wear when the bar is in use, but in all cases the inclination of each of the top and bottom fishing surfaces is unchanged in respect to the outer initial bolting face of the bar. These conditions are all observed when reforming to bars of head free type, with the exception, that the inclination of the top fishing surface is decreased.

When reforming to bars of flange free type as in Figure 12, the conditions are the same as when reforming to head free, except that the inclination of the top fishing surface remains the same, and that of the bottom is lessened.

In its simplest and preferred form, my method is directed to merely moving the top part of the bar and the upper portion of the web or middle part inward, the lower portion of the outer bolting face and the fishing surface angles remaining unchanged.

What I claim is:

1. The method of reforming an old type rail joint bar into a new type rail joint bar which consists in first heating the bar to a working temperature and then subjecting it to a reforming pressure, said reforming pressure being directed upon the whole upper part of the bar throughout its length from a point within the plane of the bolt holes thereby to press and deflect said upper part of the bar inwardly at an angle to the remaining lower part of the bar forming two angularly related bolting faces, the outer web face of the bar, below the bolt axes, being restrained during the pressing operation against deformation or deflection throughout its length.

2. The method of reforming an old type rail joint bar into a new type rail joint bar which consists in first heating the bar to a working temperature and then subjecting it to a reforming pressure, said reforming pressure being directed upon the whole upper part of the bar throughout its length from a point within the plane of the bolt holes thereby to press and deflect said upper part of the bar inwardly at an angle to the remaining lower part of the bar forming two angularly related bolting faces, the said reforming pressure also being concentrated about the upper inner corner of the bar forming thereat a rounded rail head fillet bearing, the outer web face of the bar, below the bolt axes, being restrained during the pressing operation against deformation or deflection throughout its length.

3. The method of reforming an old type rail joint bar into a new type rail joint bar which consists in first heating the bar to a working temperature and then subjecting it to a reforming pressure, said reforming pressure being directed upon the whole upper part of the bar throughout its length from a point within the plane of the bolt holes thereby to press and deflect said upper part of the bar inwardly at an angle to the remaining lower part of the bar forming two angularly related bolting faces, the said reforming pressure also being concentrated about the upper inner corner and top of the bar forming thereat a rounded rail head fillet bearing and a flat rail head bearing, the outer web face of the bar, below the bolt axes, being restrained during the pressing operation against deformation or deflection throughout its length.

GEORGE LANGFORD.